United States Patent [19]

Bowen et al.

[11] 4,403,589
[45] Sep. 13, 1983

[54] SPARE TANK SYSTEM FOR MOTOR VEHICLE

[76] Inventors: John G. Bowen, 11521 Heathcliff Ave., Santa Ana, Calif. 92705; Eugene N. Kovalenko, 461 Peralta, Long Beach, both of Calif. 90803

[21] Appl. No.: 280,224

[22] Filed: Jul. 6, 1981

Related U.S. Application Data

[63] Continuation-in-part of Ser. No. 160,975, Jun. 19, 1980, abandoned.

[51] Int. Cl.³ .......................................... F02M 21/02
[52] U.S. Cl. .................................. 123/525; 123/575; 123/515
[58] Field of Search ............... 123/527, 525, 526, 3, 123/575, 180 R, 180 AC, 187.5 R, 515

[56] References Cited

U.S. PATENT DOCUMENTS

| | | | |
|---|---|---|---|
| 1,501,376 | 7/1924 | Skinner | 123/180 A |
| 3,807,377 | 4/1974 | Hirschler, Jr. et al. | 123/575 |
| 4,178,882 | 12/1979 | Anderson et al. | 123/3 |
| 4,305,350 | 12/1981 | Brown et al. | 123/575 |

Primary Examiner—Charles J. Myhre
Assistant Examiner—E. Rollins Cross
Attorney, Agent, or Firm—Keigh D. Beecher

[57] ABSTRACT

A spare tank system for a motor vehicle is provided which may conveniently be coupled into the normal fuel line of the vehicle, and which comprises a conduit in which a valve and a fitting are mounted. During normal operation of the motor vehicle, the valve is in a first operating position, and the fuel from the normal fuel system flows through the fuel line and through the conduit to the engine without being impeded in any way. One or more closed cylinders, or other pressurized containers of fuel, such as gasoline, are also provided which may normally be carried in the trunk of the vehicle. Should the vehicle run out of gas, the valve is set to a second operating position, and the nozzle of the container is inserted into the fitting, so that fuel from the container may now flow through the conduit to the engine, with the normal fuel system being shut off.

5 Claims, 3 Drawing Figures

U.S. Patent    Sep. 13, 1983    4,403,589
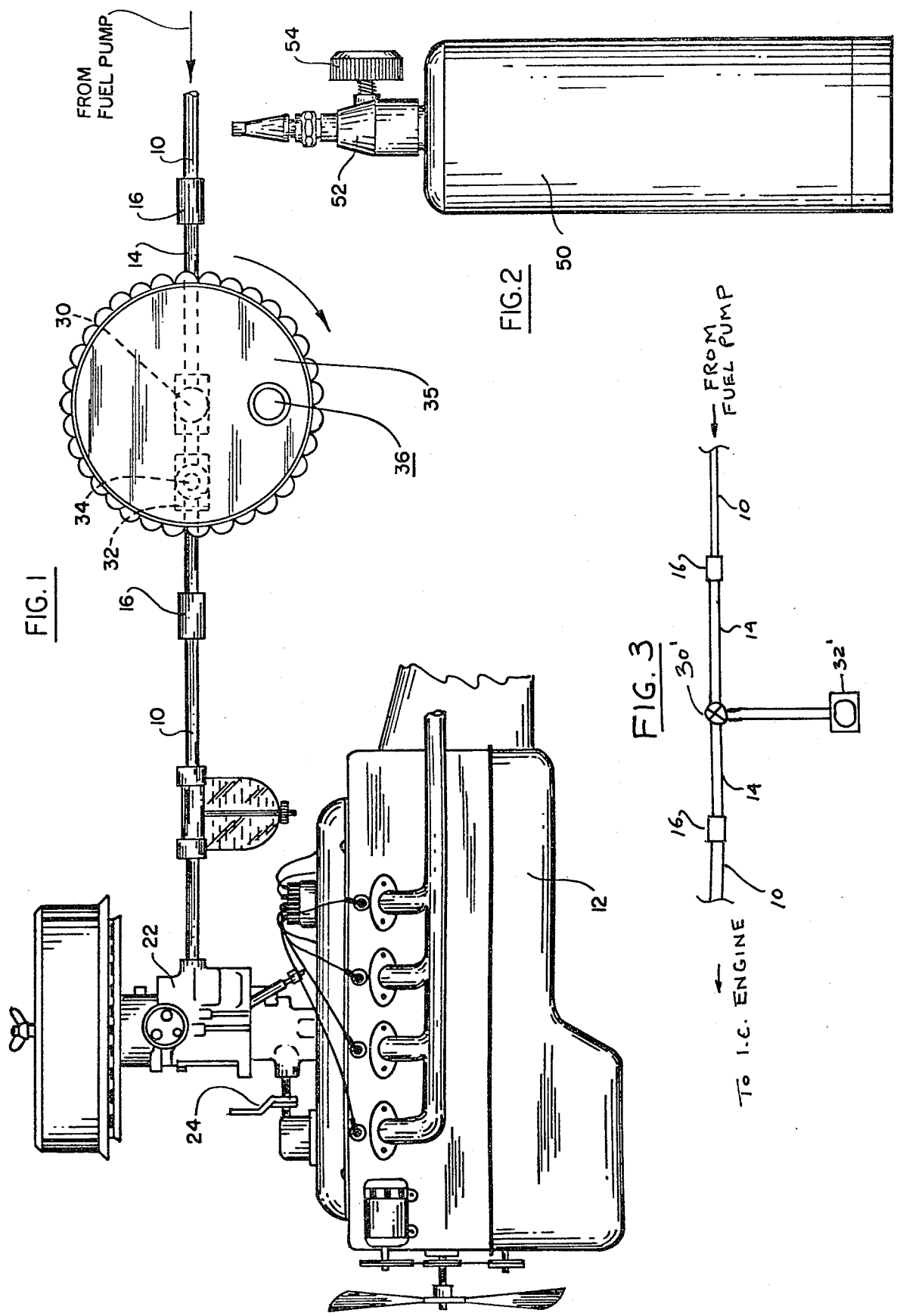

SPARE TANK SYSTEM FOR MOTOR VEHICLE

This application is a continuation-in-part of copending application Ser. No. 160,975 which was filed June 19, 1980, now abandoned.

BACKGROUND

The purpose of the invention is to provide an emergency system so that fuel may be supplied to an internal combustion engine in the event of a failure of the normal fuel system, such failure including, for example, the system being out of gasoline, a clogged filter, fuel pump failure, and the like.

In the practice of the invention one or more cylinders, or other containers of fuel are carried in the trunk of the vehicle. When such a container is used in conjunction with the internal combustion engine, gravity flow may be used to cause the fuel in the container to reach the engine. As an alternative, the fuel in the container may be pressurized, so that when the container is used in conjunction with the engine, the fuel in the container is supplied to the engine by the internal pressure of the container.

In the event of a fuel system failure, the aforementioned valve is turned to shut off the normal fuel system and to expose the fitting into which the nozzle of the container of fuel may be inserted. When the nozzle of the container is inserted into the fitting, the valve on the nozzle may then be opened either automatically or manually to inject an emergency supply of fuel directly into the engine, by-passing the normal fuel system.

The purpose of the system of the invention is to provide the motorist with sufficient fuel to reach a service station in the event an emergency arises, and to avoid costly and frustrating delays and/or roadside service charges.

It is preferred that the spare fuel be stored in sealed pressurized containers to be absolutely safe. Then, one or more of the containers may be stored in the trunk of the vehicle. The containers, for example, may be cylinders of the type presently being used in marketing propane.

BRIEF DESCRIPTION OF THE DRAWING

FIG. 1 is a view of an internal combustion engine, and of one embodiment of the emergency system of the invention which is installed in conjunction with the internal combustion engine;

FIG. 2 is a side view of a typical cylindrical container which may be used to store the emergency fuel for use in the system of the invention; and FIG. 3 is a schematic representation of a second embodiment of the system of the invention.

DETAILED DESCRIPTION OF THE ILLUSTRATED EMBODIMENTS

In the practice of the present invention, the normal fuel line 10 which supplies fuel to an internal combustion engine 12 is cut, and a conduit 14 is interposed in the fuel line, and is coupled to the fuel line by appropriate couplings 16.

As shown, the fuel line 10 is coupled into a carburetor 22 of the internal combustion engine 12, and the mixture from the carburetor into the engine is controlled by a usual throttle valve 24.

A manually operated valve 30 is inserted in conduit 14, as is a fitting 32. Fitting 32 is equipped with a spring-loaded valve 34 which normally prevents fuel from escaping out through the fitting.

During normal operation of the internal combustion engine 12, valve 30 is open, so that fuel from the fuel pump of the vehicle may flow unimpeded through the fuel line and through conduit 14 to the internal combustion engine. However, should an emergency arise insofar as the supply of fuel to the engine 12 is concerned, valve 30 may be turned to its closed position by turning its handle 35 so as to isolate the normal fuel system from the engine. Handle 35 has an opening 36 in it, and when the handle is turned to close valve 30, the fitting 32 is revealed through the opening 36.

Spare fuel may be carried in one or more containers such as cylinder 50 in FIG. 2, and such containers may be stored in the trunk of the vehicle. As mentioned above, container 50 may be a cylinder of the type in which propane fuel is normally marketed. The fuel, such as gasoline or diesel fuel, stored in partially filled container 50 may be pressured, for example, by nitrogen gas at a pressure of 4–100 psi, and higher. The container 50 is normally sealed, so that it may be stored in the trunk of the vehicle without any hazard. Container 50 is provided with a nozzle 52, and a manually operated valve 54 is mounted on the nozzle, and which is normally closed.

When the handle 35 is turned to close valve 30, and when opening 36 reveals fitting 32, then the nozzle 52 on container 50 may be inserted into the fitting. When that occurs, the spring-loaded valve 34 in the fitting is opened. Then, valve 54 may be turned to open the container 50, and to allow the fuel in the container to be forced directly into the engine. Valve 54 may be an automatic type of valve which opens when the container is inserted into the fitting 32.

Problems have been encountered in the embodiment of FIG. 1, in that there is a tendency for valve 34 to leak during normal operation of the system. This problem is solved by the assembly of FIG. 3. In the latter assembly, valve 30 is replaced by a diverter valve 30'. Valve 30' has a first position in which fuel from the fuel pump is passed through the valve to the engine and fitting 32' is shut off by the valve; and the valve has a second position in which fuel from the pressurized container 50 (when the container is inserted into the fitting and valve 54 is turned on) is passed to the engine and fuel from the fuel pump is shut off. In the latter embodiment there is no need for a valve in fitting 32', and there are no leakage problems.

Valve 30' can be manually operated, or it can be a solenoid valve. Fitting 32 can be located in the trunk of the vehicle, or at any other convenient position in the vehicle.

The system of the invention may also be used to prevent unauthorized use of the vehicle. For that purpose, when the vehicle is unattended, the diverter valve is set to the position in which it blocks the flow of fuel from the fuel pump, so the vehicle cannot be started. For that purpose, the valve may be controlled by an appropriate solenoid which is energized by a key operated switch, with the key operated switch being placed in a hidden position.

The invention provides, therefore, a safe and reliable emergency system, by which spare fuel may be provided for an internal combustion engine in a quantity sufficient to permit the vehicle in which the system is installed to be driven to the nearest service station. It should also be noted that the system of the invention can also be used as an effective means for preventing theft of the vehicle. This is achieved by simply turning the handle 35 to its position in which valve 30 is closed, and by locking the handle in that position.

It will be appreciated that while particular embodiments of the invention have been shown and described, modifications may be made, and it is intended in the accompanying claims to cover all modifications which come within the spirit and scope of the invention.

What is claimed is:

1. A spare tank emergency fuel system for an internal combustion engine of a motor vehicle comprising: a conduit adapted to be interposed in the fuel line of the internal combustion engine; a valve mounted in said conduit and having a first position for permitting the free flow of fuel through the fuel line and through the conduit from the normal fuel supply system to the internal combustion engine, and said valve also having a second position for isolating the normal fuel supply system from the internal combustion engine; a pressurized container of fuel constituting an auxiliary fuel source and having a nozzle; and a fitting coupled to the conduit for receiving the nozzle to enable the fuel to flow from the pressurized container through the conduit to the internal combustion engine when the valve is in its second position.

2. The spare tank emergency fuel system defined in claim 1, in which the fitting is located directly in the conduit and spaced along the conduit from the valve.

3. The fuel system defined in claim 2, in which the valve is manually operated, and which includes a handle, said handle having an opening therein to expose the fitting when the valve is turned to its second position.

4. The fuel system defined in claim 2, in which the fitting includes a spring-loaded normally closed valve which is caused to open when said nozzle is inserted into the fitting.

5. The fuel system defined in claim 1, in which the fitting is coupled to said conduit through a further conduit, and in which said valve permits fuel flow from the container through said further conduit to said first-named conduit and blocks the flow of fuel from the normal fuel system when in its second operating position, and unblocks the normal fuel system and shuts off the flow of fuel from the further conduit when said valve is in its first operating position.

* * * * *